| 9 | 11 | 13 |
|---|---|---|
| S | 570 + 0 = 570 | 12 |
| A | 30 + 11 = 41 | 1 |
| M | 390 + 25 = 415 | 5 |
| P | 480 + 43 = 523 | 9 |
| L | 360 + 57 = 417 | 6 |
| E | 150 + 70 = 220 | 2 |
| SP | | |
| O | 450 + 100 = 550 | 10 |
| F | 180 + 114 = 294 | 4 |
| SP | | |
| C | 90 + 143 = 233 | 3 |
| O | 450 + 156 = 606 | 13 |
| M | 390 + 170 = 560 | 11 |
| P | 480 + 188 = 668 | 15 |
| O | 450 + 202 = 652 | 14 |
| S | 570 + 216 = 786 | 18 |
| I | 270 + 227 = 497 | 7 |
| T | 600 + 235 = 835 | 19 |
| I | 270 + 248 = 518 | 8 |
| O | 450 + 256 = 706 | 17 |
| N | 420 + 270 = 690 | 16 |

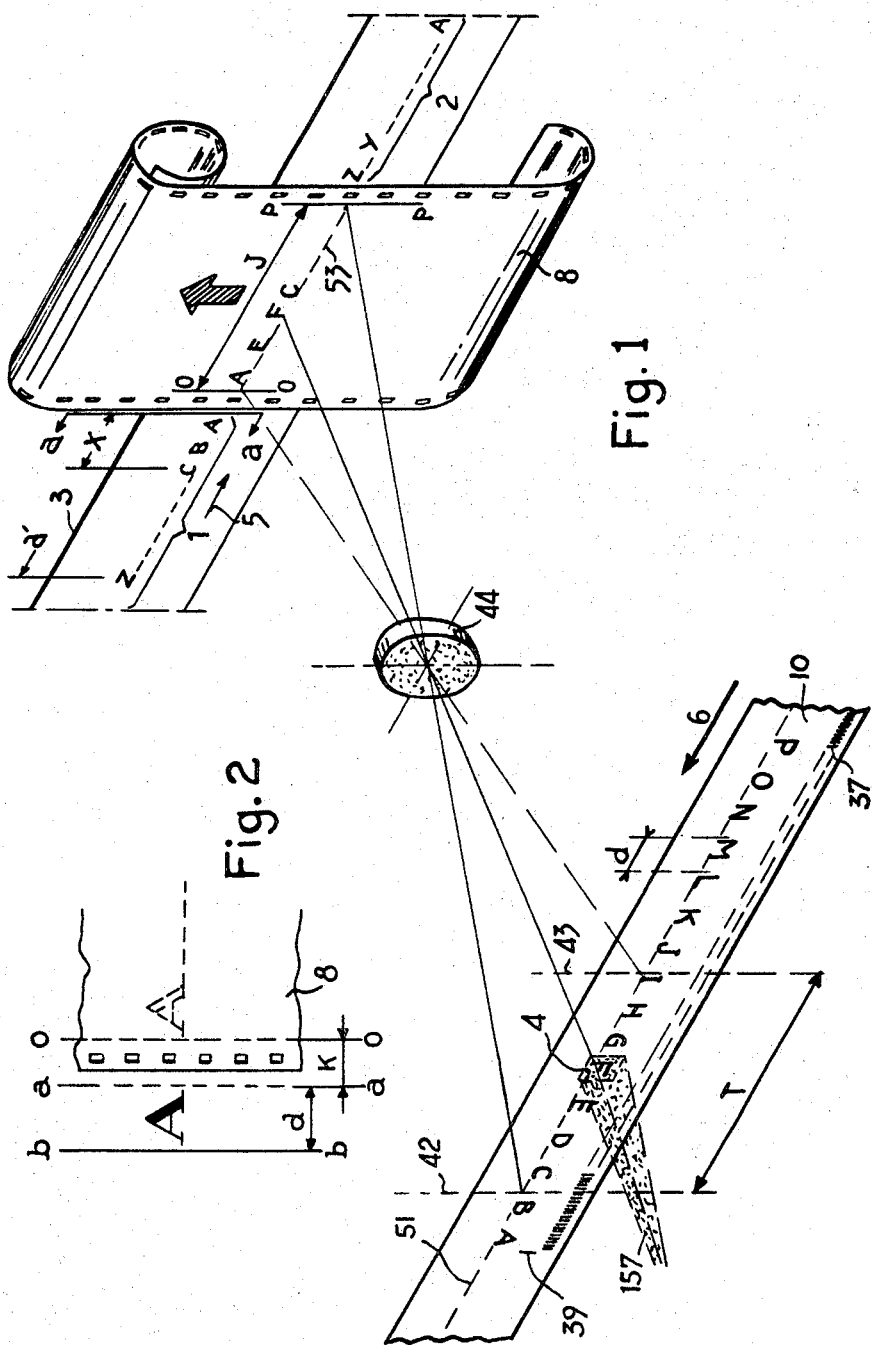

| 5 | | | 7 |
|---|---|---|---|
| 1 | A = | 30 | 14 |
| 2 | B = | 60 | 14 |
| 3 | C = | 90 | 13 |
| 4 | D = | 120 | 15 |
| 5 | E = | 150 | 15 |
| 6 | F = | 180 | 14 |
| 7 | G = | 210 | 15 |
| 8 | H = | 240 | 15 |
| 9 | I = | 270 | 8 |
| 10 | J = | 300 | 11 |
| 11 | K = | 330 | 15 |
| 12 | L = | 360 | 13 |
| 13 | M = | 390 | 18 |
| 14 | N = | 420 | 15 |
| 15 | O = | 450 | 14 |
| 16 | P = | 480 | 14 |
| 17 | Q = | 510 | 14 |
| 18 | R = | 540 | 15 |
| 19 | S = | 570 | 11 |
| 20 | T = | 600 | 13 |
| 21 | U = | 630 | 15 |
| 22 | V = | 660 | 14 |
| 23 | W = | 690 | 18 |
| 24 | X = | 720 | 15 |
| 25 | Y = | 750 | 15 |
| 26 | Z = | 780 | 12 |

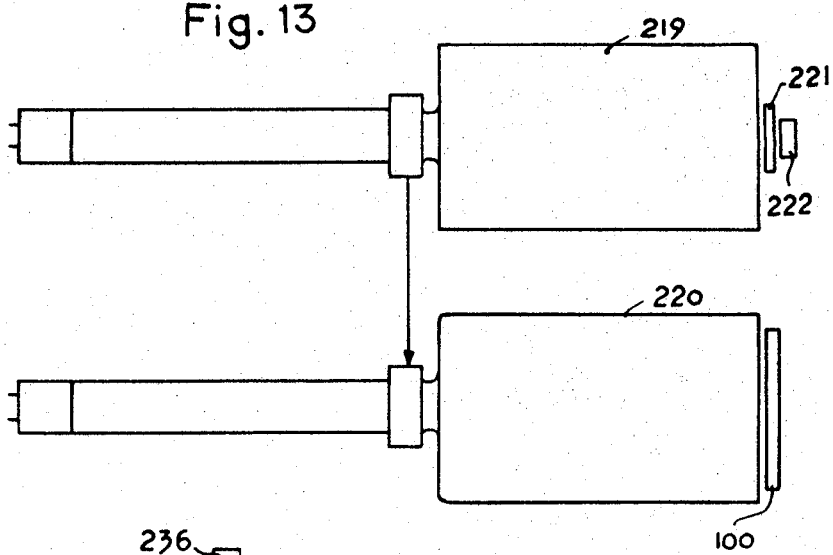
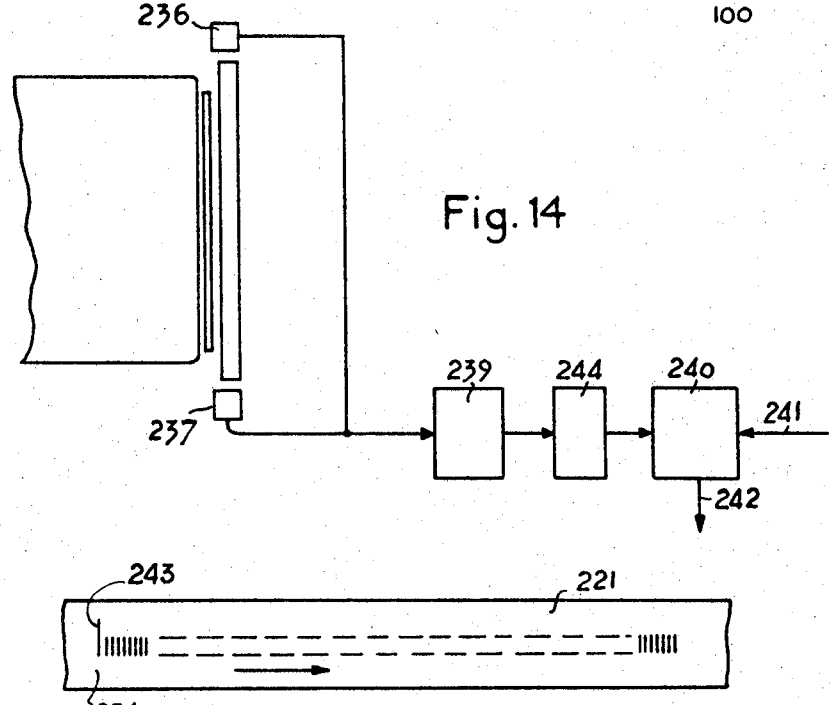

United States Patent Office 3,416,420
Patented Dec. 17, 1968

3,416,420
PHOTOGRAPHIC COMPOSITION APPARATUS
Louis M. Moyroud, 50 Brooks St., Medford, Mass. 02155
Filed Nov. 9, 1965, Ser. No. 506,936
Claims priority, application Great Britain, Nov. 10, 1964, 45,719/64
3 Claims. (Cl. 95—4.5)

This invention relates generally to photographic composition apparatus used principally for the composition of type characters. More particularly is this invention an improvement upon the invention described in my Patent No. 3,188,929, issued June 15, 1965. In accordance with the essential features of that invention, a fixed matrix containing master characters was positioned in front of a projecting lens which was swept back and forth causing the images of the master characters to be swept back and forth across a film plane. Each character had associated with it a flash tube device which was activated to illuminate the character and cause its projection onto the film plane at the desired position.

In the present invention the matrix is moved continuously past a fixed projection lens and is illuminated by a patch of light formed on the face of a cathode ray tube. The matrix support in a preferred embodiment of the invention can take the form of a continuous band carried on two rotating drums as described in my co-pending application Ser. No. 368,839, or it may take the form of a drum as described in my copending application Ser. No. 388,810.

A general object of this invention is to provide a very fast and versatile photographic composing machine wherein the characters are illuminated by a cathode ray tube.

Another object of this invention is to provide a relatively simple and extremely rapid means of illuminating characters as they move continuously past an illuminating device in the form of a cathode ray tube.

A further object of the present invention is to provide a means for controlling the horizontal deflection of a cathode ray tube directly by a binary-to-analog conversion of an accumulated width value representing the accumulated widths of all the characters and spaces previously projected in a line.

The invention will now be described in more detail, by way of example, with reference to the accompanying drawings, in which:

FIG. 1 illustrates schematically one of the principles of this invention where the width of the film is swept in a continuous manner by character images.

FIG. 2 is a detail of FIG. 1 taken at line a—a.

FIGS. 13 and 14 show an alternative arrangement to control the selective deflection of a cathode ray beam.

FIG. 15 represents a control grid used for selective deflection of a cathode ray tube beam.

Figures 3, 4, 5:
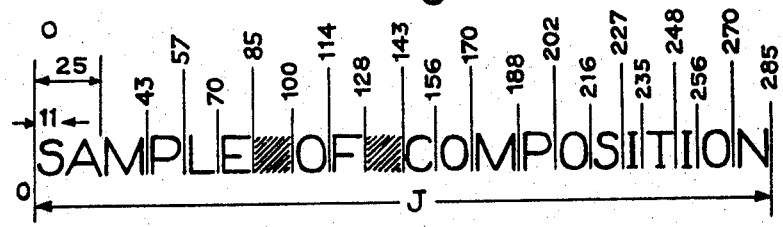
FIG. 3 illustrates consecutive chronological moments in the projection of a typical line of type.
FIGS. 4 and 5 represent characteristic numbers associated with each character of a line used to position these characters correctly within said line.

FIGURE 1 is similar to FIGURE 1 of Patent No. 3,188,929 except that the lens 44 is fixed and the characters are carried on a continuously moving matrix 10 and are illuminated by the formation of a patch of light 4 which is formed on the face of a cathode ray tube (CRT) or the like. The sensitized film 8 is continuously swept by the potential images of all the characters in the alphabet as they are moved continuously past the lens 44.

In Patent No. 3,188,929 the relative displacement of character images and the film, i.e., the sweeping of the film by the character images was obtained by using a fixed character matrix and a moving lens. In the present invention however the same relative displacement is obtained by using a fixed lens and a continuously moving matrix.

It is assumed here that matrix band 10 is made of appropriate material such as film, or film to a mechanically resistant material. All the characters of the alphabet appear on the matrix 10 in the form of transparent images on opaque background in a preferred embodiment of the invention. However, it is apparent that the characters could be opaque on a transparent background although in practice this has not given equally satisfactory results.

As the matrix 10 is continuously moving in the direction of arrow 6, the lens 44 projects continuously moving character images onto the surface of film 8 along base line 53. It is assumed in the present description that the lens 44 is positioned so as to produce images of the same size as the object or master characters in order to simplify the description of the operation of the machine. It is evident that a "zoom" lens or lenses of variable focal length mounted on a lens turret can be substituted for the lens 44 so that different character sizes could easily be obtained. Different magnifications of the master characters do not affect the operation of the machine embodying the present invention.

Line O—O in the film 8 represents the left-hand margin of the line to be composed and line P—P the right-hand margin of the same line. The length of this line is represented by distance J. Examination of the figure shows clearly that the only master characters producing an image on the line to be composed at a given time are located between fixed imaginary lines 42 and 43 in the matrix plane which are respectively the conjugates of lines P—P and O—O in the image plane. As the matrix 10 moves in the direction of arrow 6, the character images move in the direction of arrow 5 in the film plane. During one alphabet sweep, the character images move from position 1 to position 2.

The character to be projected according to an important feature of the invention, is projected by instantly deflecting and unblanking a CRT to produce on its face patches of light of high intensity and very short duration. Such tubes are commercially available today. They can produce a high density latent character image on commonly used phototypesetting film with a total exposure of the order of 2 microseconds, including the light decay of the phosphor. It can be said for purpose of illustration that the cathode ray tube is suddenly asked by the control circuit of the machine to hunt for the moving master character and flash its image at an exactly determined moment during the passage of character images on the face of the film.

The distance $d$ separating two consecutive characters of the matrix has been made relatively large in order to decrease the accuracy required of the CRT deflection circuit. Through the appropriate use of an "extruded" electron beam the tube can produce on its face a luminous patch of approximately square section. This area is purposely made substantially larger than the maximum area which can be occupied by a character so that the CRT beam can be located with a tolerance as high as plus or minus one-thirty-second of an inch. Of course the CRT end plate which is not shown in FIG. 1 is preferably located close to the matrix band. In the present invention the character to be projected is caught "on the fly" at a location in the matrix plane which is continuously variable so that there is not a given location on the face of the CRT assigned to a given character.

In order to accurately time the moment at which the CRT must be unblanked to produced a flash and also in order to cause the exact deflection of the beam, there is provided on the matrix 10 at least one row of timing slits 37. These slits are preferably spaced by one width unit. This unit can be one-eighteenth of an em as is well known in the art. An additional slit 39 is utilized to signal the beginning of a new alphabet sweep, or the passage of special groups of characters.

One of the principles of operation of the present invention will be described with reference to FIGS. 1 to 5. Suppose that a line "SAMPLE OF COMPOSITION" is to be composed on the film 8. Assume also that this line is to be justified so that the distance between a left-hand reference line or margin O—O and the right-hand reference line or margin P—P following the last character is defined as "J." All the characters and signs which may be required to compose a line of text are on the matrix 10, and are preferably transparent on an opaque background and aligned on the same base line. As the matrix is moved in the direction of arrow 6, the images of all the characters required to compose a line of text will sweep the whole width of the film 8 as the character images move from area 1 to area 2. It is evident that at a certain time during this movement each character in the line "SAMPLE OF COMPOSITION" would be projected to its corresponding or desired character image position on the film. The characters are not continuously illuminated, but when each character image is at the appropriate position on the film, it is projected on to the latter by the bright patch 4 formed on the face of a CRT. In this way, in one passage of the alphabet, the whole line is projected.

The method used in one embodiment of the invention to determine the time at which the characters are flashed during the sweeping operation will now be described. The characters of the alphabet shown on the matrix 10 are preferably equally spaced by a distance $d$ as shown in FIG. 1. In the example shown the distance $d$ between reference lines along the left-hand margins of consecutive characters of the alphabet image is 30 units instead of 20 units as is the case in Patent No. 3,188,929. This is done to reduce the accuracy requirement placed upon the CRT, as explained above. By increasing the spacing between master characters on the matrix, we also reduce the likelihood of having to flash simultaneously two or more characters. This will be apparent by examining FIG. 1 where it is clear that the wider apart the characters are spaced, the fewer the characters included in the area T confined by lines 42 and 43. No character can be projected to film 8 unless it is in this area, and consequently simultaneous character projections can occur only for characters located in this area.

As is well known in the printing art, the characters of the alphabet are of varying widths expressed in units of an "em," and we have assumed in the present embodiment that the widest character of the upper case alphabet is 18 units and the narrowest character is 8 units, as shown at column 7 in FIG. 4. In FIG. 1 the distance $x$ from the left-hand reference line of any character image to a line $a—a$ positioned at 30 units to the right of the left-hand reference line of the first character is 30 times the rank of the character on the alphabet. This product is called "rank value" and is shown for each character at column 5 in FIG. 4. As the projection of the alphabet moves from position 1 to position 2 there will be a time at which the line $a—a$, located at 20 width units from the reference line of the first character of the alphabet in the "sweep" direction, will coincide with the line O—O, the latter line representing the left-hand margin of the line to be composed. According to a feature of the present invention, the matrix 10 carries upon it photocell timing slits 37 and 38 which activate an appropriate circuit effective to generate timing pulses as soon as the line $a—a$ coincides with the line O—O, and thereafter one impose is generated each time the alphabet image moves a unit distance equal to ⅟₁₈ of an em. This unit value is used for all measurements of line and character widths in the present description.

As the left-hand reference line $b—b$ (FIG. 2) of the first character A of the alphabet is situated at a distance from the line $a—a$ equal to 30 units, it is clear that when the line $a—a$ has moved 30 units to the right of the line O—O, the character A is in position to be projected flush with the left-hand margin of the text, represented by the line O—O. For another example, the character E will be in position for projection of the same location, flush with the left-hand margin, 150 pulses after the line $a—a$ has crossed the line O—O as is shown in FIG. 4.

The location of the characters in the line does not, of course, depend solely on the location of the characters in the alphabet but also on the space occupied by all the preceding characters in the selected line, including justifying spaces. Consequently, it is necessary in order to determine the moment at which any character is to be projected on to the film, to add to its rank value, expressed in units, a value also expressed in units equal to the sum of the widths of the individual characters and spaces preceding that including justifying space values, if any. The sum of these values, for the example chosen, is shown in FIG. 5. In this figure, the number of pulses determining the projection time for each character is shown at column 11 and the "flash order" at column 13. "S," being the first character of the line, will be flashed after a number of pulses equal to its rank value or 570 as shown in FIG. 4. As "S" is 11 units wide, the letter "A," the second character of the line, will be flashed after a number of pulses equal to 30, which is the rank value of "A," plus 11, which is the unit width of "S," or a total of 41 units or pulses following the crossing of the line O—O by the line $a—a$. In the same way, it will be found that the letter "M" is to be flashed 415 pulses after the line $a—a$ crosses the line O—O, as determined by adding to the rank value of M, 390 units, the widths of the preceding characters or 25 units. The number of units traveled by the alphabet image after the line $a—a$ has crossed the line O—O at which each character should be flashed is shown at column 11 in FIG. 5 and is measured by pulses generated by photocell slits 37. FIG. 3 shows the location of each character of the sample line measured from the line O—O in terms of units. It also shows justifying spaces as blank characters SP of 15 units width. The widths of the justfying spaces are determined by a justification computation carried out before the projection of the line is started. FIGS. 1 and 5 show clearly that the characters are not projected on to the photographic film either in the order in which they appear in the line or in alphabetical order but in a sequence which depends on the sum of the rank value of each character and the added widths of all characters and spaces that precede it in the line. The flash order is given at column 13 in FIG. 5 and in the example shown the last character to be projected will be "T." The "A" will be projected at pulse 41 and the last character "T" will be projected at pulse 835.

Figure 6:
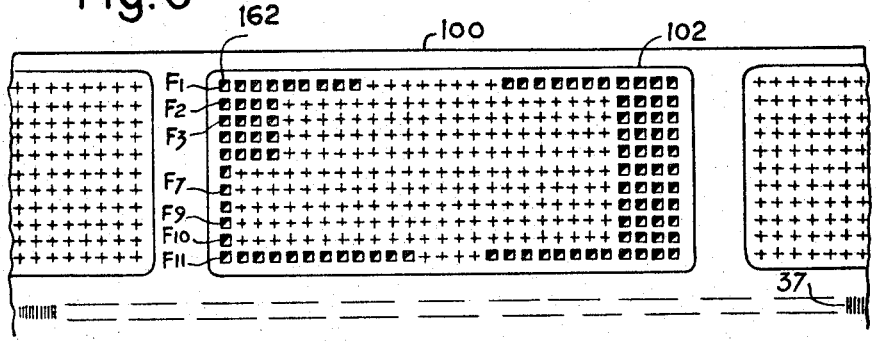
FIG. 6 represents a matrix band as used in one embodiment of the invention.

In a preferred embodiment of the machine, the matrix 10 is as shown in FIG. 6. In this figure various type faces are located on different matrix sections shown at 102. These sections could be in the form of film strips accurately located in openings provided in a holder 100, which could be a steel band. Alternatively the film sections could be accurately located and held to a holder 100 which takes the form of a drum, as described in copending applications Ser. Nos. 338,810 and 441,738. In FIG. 6, a character area is shown at 102, and different type faces may be located at different rows such as $F_2, F_3, \ldots F_9, F_{10}$ and $F_{11}$. Assuming that an alphabet includes upper case, lower case, figures and other signs comprising generally 90 characters, it will be necessary to utilize three matrices such as 102, for complete alphabets in nine different type faces. The same arrangement of three matrices can be repeated along the length of the matrix strip as explained in copending U.S. application Ser. No. 368,839. If a larger number of different faces is desired, different groups of three matrices can be positioned on the same matrix band and the circuit in this case is conditioned to select one or the other group at the command of type face shift codes. The timing slits of the matrix band are schematically shown at 37. They can be located on a separate piece of film, permanently bonded into openings or slits provided in the matrix band 100, or they can be part of the different matrix strips 102. It is of course evident that the invention is not limited to the particular matrix arrangement of FIG. 6. In particular all characters of an alphabet can be in one single film matrix without any gap between consecutive groups of characters. It is also possible to use a chain rather than a band and have one or more characters located on each link of the chain as is currently done in so-called high speed chain printers.

Figure 7:
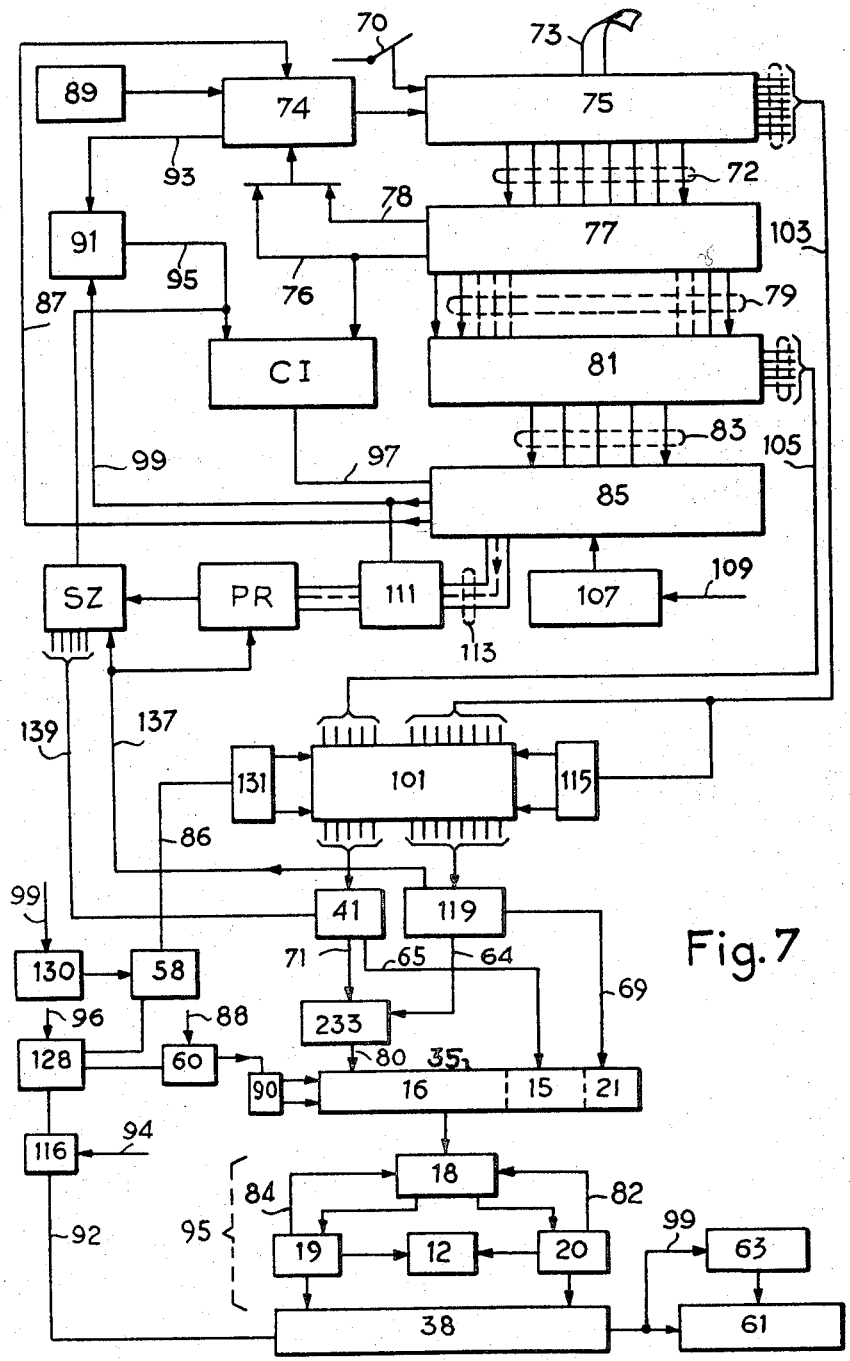
FIG. 7 is a block diagram of the main components of a control circuit of a preferred embodiment of the invention.

The control circuit of the machine is shown in the block diagram form of FIG. 7. The tape 73 can either be a punched paper tape or a magnetic tape. Lines can have been prejustified in a computer or terminated by an end-of-line signal. They can also include discretionary hyphen signals. The character codes can be those currently used for TTS operation or can represent each character by a binary number representative of the rank value of said character.

Information as to length of line, point sizes or leading may be selected at the photographic unit of the machine. The length of line is selected by a switch 107 schematically shown in FIG. 9 which lets an impulse from wire 109 prefill the width accumulator as described in application Ser. No. 312,838. The tape 73 is read by a high speed tape reader 75 operating, for example, at the rate of 800 characters per second. The operation of this tape reader can be started by a manual key 70 but is ultimately controlled by signals generated by the photocell slits 37 and 39 in order to keep all the elements of the machine running in synchronism. The character identity code or rank value, preferably in binary form, is transferred by wires 72 to an electronic decoder 77 from which 45 wires 79 emerge, one wire for each character of the alphabet. These wires are connected to the input of a width card unit 81, similar to the one described in application Ser. No. 741,209. Five wires 83 emerge from the output of the style card unit to transfer the codes in binary form of the individual widths of the characters of the alphabet, which may cover, for example, a range of from 4 to 18 units. The width information for each character is transferred to an electronic accumulator 85 which adds the width of each character as it is read to the accumulated widths of the previously read characters in order to determine the total length of the line previous to justification. When the difference between the accumulated widths of the characters of the line and the desired justification value has been reduced to a certain minimum, a stop signal is sent via a wire 87 to a gate 74, in order to stop the reading of the tape either at the end of the next interword space appearing on a wire 76 or at the next discretionary hyphen signal appearing on a wire 78. The gate 74 opens when either of these signals is added to the stop signal of wire 87. As soon as this happens, the pulse generator 89, through gate 74, sends pulses to the interword spaces counter CI in order to initiate the justification computation. The pulses from the generator 89 reach the counter CI through a gate 91 which has been opened by a signal produced by the gate 74 and sent via a wire 93. A number of pulses enter the counter 85 through wires 95 and 97 until an "overflow" pulse appears on a wire 99 to close the gate 91 at the completion of the justification computation.

The main components of the justification computation are schematically shown in FIG. 7 but different variants can be used, all based on the justification system described in said application Ser. No. 312,838. The preferred method is to preset the counter CI, during the reading of a line by the reader 75 at such a value that pulses are sent via the wire 97 to the accumulator 85 in a number equal to the number of interwords in the line as many times as necessary in order to go beyond the capacity of the accumulator 85, and thus obtain a quotient and remainder as defined in the above-mentioned patent application on justification computation. Eletronic means to carry out this computation are now well known in the art and are outside the scope of the present invention.

The result of the justification computation is stored in electronic switches PR–SZ which are positioned through a gate 111 and wires 113. The minimum interword space to which the justification increment can be added in order to justify the line as described in the above mentioned patent is preferably not used in this embodiment, the words being separated by the justification increment only, which has to be large enough to separate the consecutive words of each line by an acceptable amount. In the case where lines are not to be justified, the appropriate non-justifying space code between words should be punched on the tape or, in the case of short lines such as the line at the end of a paragraph, an appropriate space between words should be introduced by the machine as these lines are not long enough to fill the accumulator to the proper value. This can be achieved by means actuated by the reading by the tape reader of a "paragraph" code.

At the same time as the information relative to the widths of the characters is fed to the accumulator 85 it is also sent via wires 105 to a magnetic core storage 101 controlled by a "write distributor" 115 and the information relative to their identity is transferred to said magnetic core storage via wires 103, as well as any desired service information such as style shifts and also the information corresponding to the justifying spaces. This operation takes place at high speed if electronic components are used which operate in a manner equivalent to the operation of the switches and relays described in the above mentioned patents. If, for example, the line comprises 80 characters and the tape reader operates at 800 characters per second, the whole operation will take 100 milliseconds.

After a line has been transferred from the tape to the storage 101 and the justification increments of said line have been stored in register-switches PR and SZ, the information stored in the magnetic cores of the unit 101 comprises the rank value of each character, in nine binary digits for example, and the width of each character in five binary digits. The end of the justification computation can be detected by the fact that at this time the accumulator 85 overflows and transmits an output pulse on a wire 99. This pulse is fed through a delay circuit 130 and sent to a gate 58 which opens to allow timing pulses fed from a timing circuit 128 to pass through wire 86 to the read-out circuit 131 of the storage 101. This initiates the transfer of the information contained in the storage 101 to a storage 35. The rank value of the characters of the line are transferred to a decoder 119. The function of the decoder 119 is mainly to detect justifying space codes and to send a pulse through wire 137 to the justification increment register-switches PR–SZ whenever such a code appears. The decoder also transfers the rank value through wire 64 to adder 233. The character widths are transferred from the storage 101 to an accumulator 41. The purpose of this accumulator is to determine the accumulated width value of the characters and spaces preceding each character successively entered in the adder 223. These accumulated widths, as shown in FIG. 3 for the line given as an example, are made up not only of the individual character widths, but also of the justifying space widths as entered by a wire 139 from the register switches PR and SZ. For each character entry the accumulated width in the accumulator 41 is sent by a wire 71 to the adder 233 at the same time as the rank value of said character is also entered into this adder through a wire 64. The output of adder 233 will thus be the displacement value of each character of the line, in the same sequence as they appear in said line. This displacement value, in binary form, is transferred by wire 80 to section 16 or the storage 35. At the same time that the accumulated width values for each character is entered into section 15 of memory 35.

After all displacement values of the characters of the line have thus been computed and transferred, an end-of-line pulse appears on wire 88 to open a gate 60 and allow timing pulses from the circuit 128 to reach the circuit 190 of said storage. This initiates the last computation step which consists in sorting out the displacement values of the characters of the line and classifying them, with their asociated accumulated width values, in a last magnetic core storage 38. This sorting operation involved is known in the art and will be described only briefly. An electronic switch 18 allows the complete data for each character, comprising its displacement value and accumulated width value, to reach either a register 19 or a register 20. The first character data is sent, for example, to the register 19 and second character data is sent to the register 20. The displacement values of these two characters is compared in comparison circuit 12 and the character of the highest displacement value is dropped out. The next character data is then transferred to the register thus freed, and a new comparison takes place. After all of the character data in the line have thus been successively compared two by two, the character of the lowest displacement value is left in either of the registers 19 or 20 and this displacement value, together with its attached accumulated width value, is transferred to the first position of the storage 38. The whole operation is then repeated to determine the second lowest displacement value, and so on. This operation is repeated as many times as there are characters in the line, but it takes place very rapidly as each operation can be carried out in a few microseconds. In the case where the same displacement value appears in both of the registers 19 and 20, the last one entered is dropped as though it were of higher value.

At the end of the sorting operation the complete data concerning the characters in the line to be composed appears, in the order of their displacement values, in the storage unit 38, shown in detail in FIG. 15. Storage unit 38 comprises three different magnetic core memory sections 315, 317 and 321 as well as a sorting circuit 50. Section 317 is used to store the displacement value of each character in the line. It is this displacement value that determines the order in which the characters will be projected. Section 315 stores the accumulated width value associated with each character. These accumulated width values are stored in the same order as the displacement values so that when a displacement value is read out of section 317 the corresponding accumulated width value can be read out of section 315. It is the accumulated width value that determines the horizontal deflection of the CRT beam for the projection of each character. Section 321 of memory 38 is used for the storage of the function codes as they occur in a line.

In the example of composition described in relation to FIGS. 2–4, it is assumed that the first character of a line is located so that its left-hand edge is flush with the left-hand margin of lines to compose. The accumulated widths of previous character is zero in this particular case and the character will be projected by unblanking the CRT with no horizontal deflection. In order to be in the proper position to project the first character, the "zero" deflection signal locates the illuminated patch (occurring after unblanking) at a position mostly to the right of line O—O as seen in FIG. 1. The area covered by the illuminated patch must be larger than the largest character.

The first character to be flashed in the example of FIG. 3 will not be S but A because it has the lowest displacement value. The accumulated width value associated with letter A is 11 units as shown in FIGURES 3 and 5. The time at which this letter A must be flashed will be determined by comparing the displacement value associated with this letter which is 41 units as shown in FIG. 5 to the value of a counter actuated by the timing pulses of the machine. At this precise "flash time" the master character A of the matrix is positioned at the exact point along its travel to project its image at the proper location on the film to space it correctly in relation with adjacent character. We know that at this particular position, the (potential) image of A is located 11 units away from line O—O (FIG. 1). This means that the master character A, at this precise instant, is also located 11 units from "zero" line 43. At this time, by immediately deflecting the CRT beam by 11 units from "zero" and unblanking said CRT for a very short duration following a delay of the order of one microsecond to allow for the deflection time we create a luminous patch at the back of the matrix at the time when the letter A is passing this patch. In the case of the fourth character to project in the above example, which is letter F the beam will be deflected by 114 units which represents the accumulated widths of the previous characters of the line (already projected or not) as shown in FIG. 5.

The control of the CRT will now be described with reference to FIGURE 15. If the line to be composed is the one shown in FIG. 3, the characters, from top to bottom, will appear in the following order in the storage: A, E, C, F, M, L, P, S, O, etc. . . . which is the order in which they will be projected on the film. The information contained in the storage 38 is released in sequence as the alphabet image sweeps the width of the film. This release is initiated by the sweeping of the matrix character through the projection area which, for example, sends a "start" pulse through a wire 134 when the line a—a overlies the line O—O (FIG. 1). This pulse, through a gate 116 starts the reading out of the storage through a distributor 112. This distributor transfers the displacement value of the first character of the storage "A" to a counter 108 via wires 138. This counter is thus set at a value equal to the displacement value of the first character of the line to be projected.

At the same time as the "start" pulse appearing on wire 134 has caused the displacement value of the first character to be thus transferred, it has also opened a gate 143 to allow the "unit pulses" (generated by the photocell slits 37 on the matrix) of an approximate frequency, for example 10 kc., to reach a counter 67 similar to the counter 108. The value in the counter 67 increases as pulses are received, and its value is continuously compared to the value in the counter 108 through a comparison circuit 110. When these values are equal, a pulse is generated and sent by a wire 120 to the distributor 112 to energize the horizontal wire "A" and thus to read out to energize the horizontal wire A and thus to read out the first accumulated width value of the storage section 15 and to transfer this code through wires 145 to the CRT 106.

The cathode ray tube is provided with a beam-shaping aperture 161 to give to the flying spot formed by the electron beam 157 a square shape. When a flash signal is transmitted by wire 120, the accumulated width value for the character to be projected is read out of section 315 of memory 35 and transmitted via wires 145 to "binary-to-analog" converter 147, to amplifier 154 and finally to the horizontal deflection yoke 156 of the cathode ray tube. The spot positioning operation takes place while the flash signal of wire 120, after having been slightly delayed at 160 reaches the unblanking circuit 158 which causes the square-shaped beam of electrons to impinge in the screen of the cathode ray tube at a spot located behind the character to project at this time for 1.5 microseconds.

It is of course possible to use a multiple gun CRT in order to handle flashes which should occur at substantially the same time. If, for example, two different characters have to be illuminated at the same time because they have the same displacement value, one gun can be made to illuminate one character and the other gun the other character. Otherwise, it will be necessary to wait for the next passage of the characters.

The vertical deflection of the CRT is controlled by the function codes stored in section 321 of memory 38. When a function code is associated with any character it is read out simultaneously with the accumulated width value and transmitted via wires 146 to binary-to-analog converter 148, to amplifier 155 and then to the deflection yoke of the CRT and causes vertical displacement of the beam 157. In a preferred embodiment these different levels correspond to different type faces as shown in FIG. 6, where they appear at $F_1, F_2 \ldots F_{10}, F_{11}$.

Figure 9:
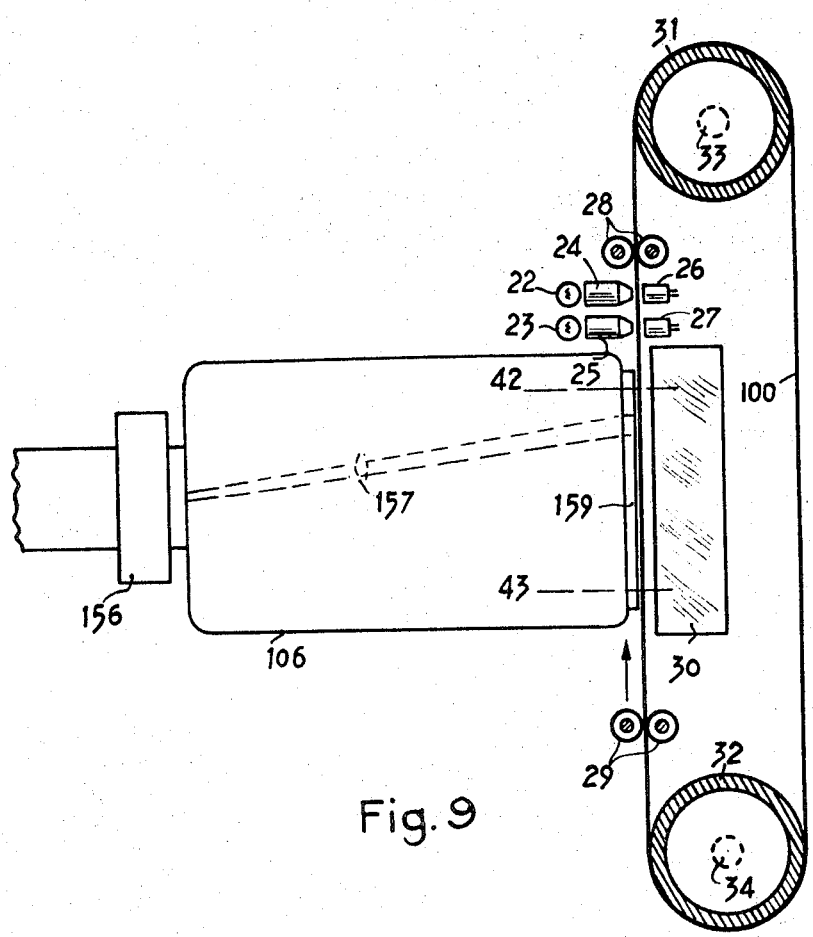
FIG. 9 represents a top view of the character image generation section of a preferred embodiment of the invention.

The matrix projection section of a preferred embodiment of the invention is shown in FIG. 9. The arrangement can be the same as described in our copending application Ser. No. 368,869. The matrix band 100 is driven by two drums 31 and 32 attached to shafts 33 and 34 connected through appropriate gearing to a motor. In order to provide for elasticity in the system, the drums can be provided with a layer of relatively soft rubber. It is important that the section of the matrix between lines 42 and 43 which are also shown in FIG. 1 be constrained in a flat plane. Guiding means such as those shown in copending application Ser. No. 368,869 can be used with any other appropriate device including the use of vacuum or compressed air to maintain the matrix strip at a constant distance from the face 159 of CRT 106. This face 159 can include the pate of glass fibers, as is well known in the art, in order to avoid scattering of the emerging light. Guide rollers 28 and 29 are provided to keep the portion of the matrix band facing the CRT in proper position and in engagement with longitudinal guides.

A photocell 26 generates pulses synchronized with the motion of the band. These pulses are generated by photocell slits 37 as previously described which are illuminated by a lamp 22 through an optical system 24. A similar lamp 23 and optical system 25 illuminate the photocell slits 39 and photocell 27 generates pulses at definite points during the passage of the band for example, at the beginning of each alphabet or type face passage.

It can be seen in FIG. 9 that the CRT is preferably positioned outside the matrix band loop in order to avoid an excessive length of said loop. The light emerging from selected characters is deflected by an arrangement comprising mirrors or a prism as shown at 30 in FIG. 9 and in FIG. 10. In the latter figure the different levels of the band 100 corresponding to different type faces are shown at $F_1, F_2 \ldots F_9$. The prism 30 can be moved up and down in a direction perpendicular to the path of master characters in order to project the preselected character level of the matrix band. Thus in the position shown in FIG. 10 prism 30 will project along the common optical axis of lens 44 the characters of level $F_7$. When prism 30 is moved to position 30', the type face will change from $F_7$ to $F_2$. Lens 44 is preferably one of several lenses of various focal lengths mounted on a lens turret 45 which can be rotated by a shaft 46 to bring on the optical axis 48 the lens corresponding to the desired point size.

The film magazine 200 is mounted on the general frame of the machine 56. At the completion of each line the film 8 is moved from a supply spool 201 to a take up spool 202. In a machine which is capable of producing up to 20 lines per second, it is necessary to reduce to a minimum the time taken by film feed between lines. This is achieved by using a mechanism similar to those used in paper or magnetic tape drives. Film 8 is normally clamped at a fixed position between a fixed plate 203 and a magnet operated plate 204. During the projection of the line the film is sitting on plate 205. It is also kept under constant tension by a torque motor, not shown, attached to shaft 208 of take up spool 202. Continuously driven rollers 207 can be engaged by an electromagnet controlled roller 206. This roller is in continuous engagement with the film and during the projection of a line, it is sufficiently spaced from rollers 207 not to cause too much drag on film 8. Spool 201 is also controlled by a torque motor but through means which may include limit switches. Film 8 is caused to form a loose loop between spool 201 and clamps 203–204. At the completion of the projection of a line, roller 206 is moved into engagement with rollers 207 at the same time as clamp 204 is disengaged from fixed plate 203. The amount by which the film is driven is controlled by codes in the control tape of the machine. This amount of film feed or leading can be controlled by measuring means attached to roller 206.

Figure 8:
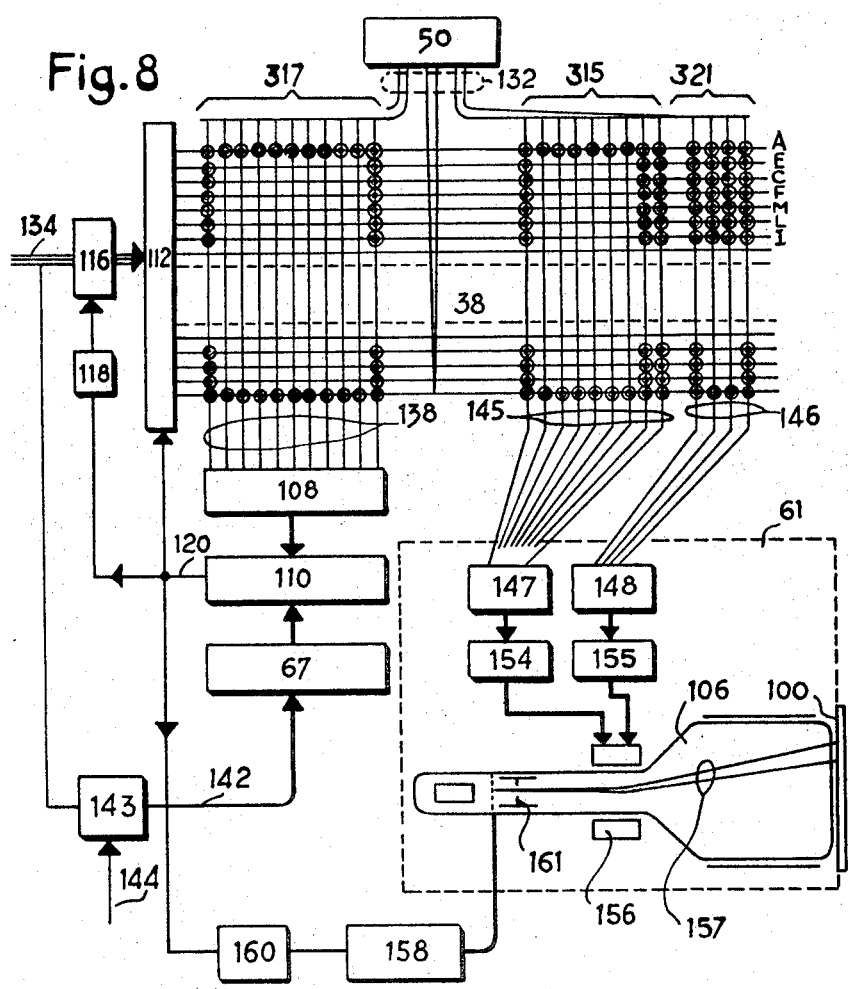
FIG. 8 represents schematically a preferred character illumination system control circuit.
Figure 11:
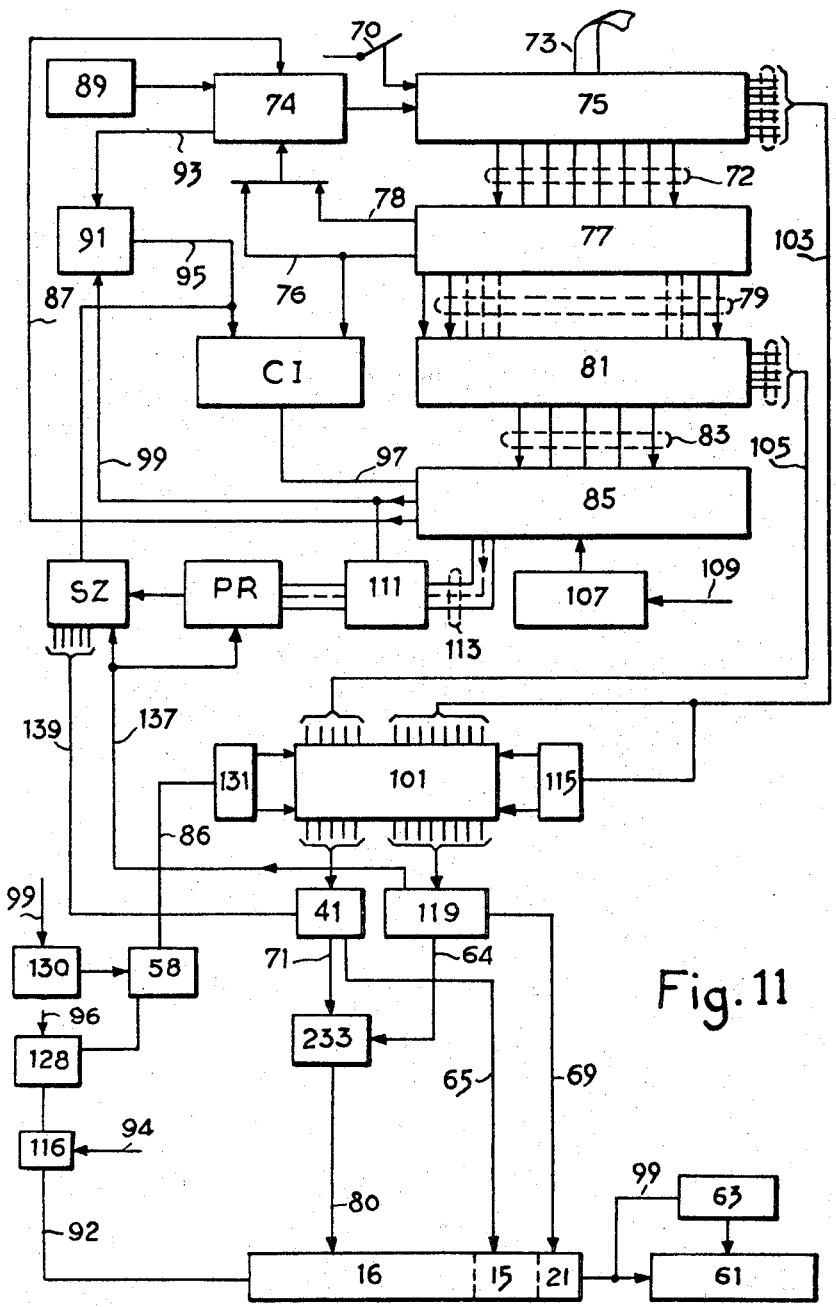
FIG. 11 is a block diagram representing the control circuit of the machine for an alternative mode of operation.

In the arrangements and operation of the machine described so far, it has been assumed that a full line was projected in one single alphabet sweep except in the case where several so-called simultaneous flashes would necessitate more than one character sweep. It is within the scope of the present invention to use the machine in such a way that characters will be projected in the same order as they appear in the printed sheet. This particular mode of operation of the machine calls for a simplified control circuit but reduces substantially the speed at which lines can be composed. The control circuit of the machine for the lower speed mode of operation is shown in FIG. 11. It can be seen that FIG. 11 differs from FIG. 7 only in that the sorting circuits generally shown at 95 in FIG. 7 have been removed. Turning now to FIG. 8, the characters in storage 38 are not, in this mode of operation, arranged by order of displacement value. The characters are now arranged as they are read in the line. In general more than one character will be projected for each character passage. The performance of the machine used in this mode of operation can further be improved by repeating along the matrix band the most frequently used characters. It has been experimentally found that the speed of the machine used in this mode of operation can further be improved by repeating along the matrix band the most frequently used characters. It has been experimentally found that the speed of the machine can be materially increased by repeating five times, for each type face, the 16 most frequently used characters in the English language in lower-case and twice the same characters in upper-case.

Figure 12:
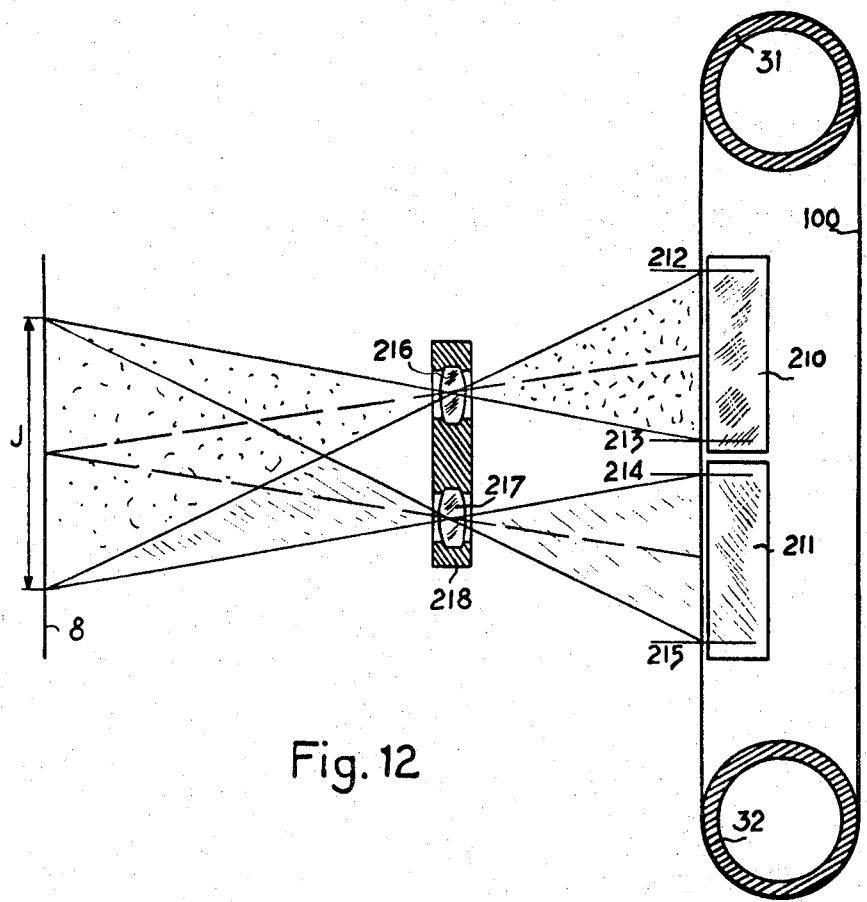
FIG. 12 shows schematically how the versatility and speed of the invention can be increased by an alternative optical arrangement.

The flexibility and speed of the machine can further be increased by using the arrangement of FIG. 12. In this arrangement two active sections of the matrix band are optically merged to reach the same area on film 8 as shown. Each active section of the matrix band 100 corresponds to the section T of matrix band of FIG. 1. These sections are shown in FIG. 12 as contained between lines 212 and 213 and between lines 214 and 215. In this particular modification of the machine two lenses 216 and 218 are utilized to simultaneously project the two sections, as previously defined, of matrix 100 at the same location on film 8. It is evident that other means such as half-silvered mirrors or prisms can be used rather than different lenses. Each active section of the band 100 is associated with individual reflection prisms shown at 210 and 211 of the same construction as prism 30 of FIG. 10. Each section can also be associated with a cathode ray tube or with a number of separate guns of the same cathode ray tube, as is well known in the art. One purpose of this arrangement is to catch the alphabet twice as it passes the lens system. Thus in the slow speed mode of operation of the machine the speed can be substantially increased as characters of twice as much chance of being projected during one passage of the band 100 than in the system using only one active section of said band.

Another advantage of the system shown in FIG. 12 is that high speed merging of various type faces can be easily achieved. This is obtained by positioning prisms 210 and 211 at the desired level in relation with the matrix strip. For example, if it is desired to mix at high speed the type face shown on level $F_2$ (see FIGS. 6 and 19) with the type face of level $F_7$ prism 210 can be moved up to project level $F_2$ and prism 211 can be moved down to project level $F_7$. Further increase in mixing speed can also be obtained by placing along the matrix band 100 one after the other several alphabets of different faces. In a preferred arrangement we dispose two 90-character alphabets of different type face along band 100 and provide for 8 positions for deflecting prisms 30 which gives a total capacity of 16 different alphabets of 90 characters each with the possibility of mixing at high speed four of these different alphabets.

Figure 10:
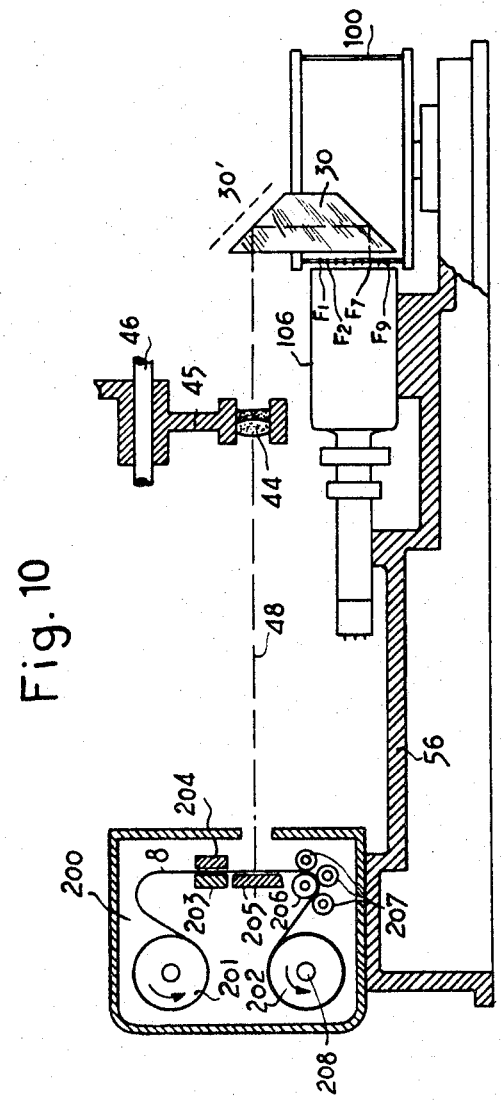
FIG. 10 is a cross-section view of the major mechanical and optical components of a preferred embodiment of the invention.

In the arrangement shown in FIG. 10 except for the optical mixing of levels shown in FIG. 12 and for the fact that several type faces can be positioned on the same level of the tape it is necessary to move prism 30 up and down to select a type face. This can be avoided by positioning in between lens 44 and film 8 a pair of reflecting surfaces as explained in Patent No. 3,188,529. In this case it is possible, for example, to produce on the same base line on the film any of the 11 rows $F_1$–$F_{11}$ shown in FIG. 6 which can each include each one complete type face. As an alternative, the matrix strip 102 of FIG. 6 can include the same character arrangement as described in said patent and, through the action of the reflecting surfaces all the characters of a line can be projected during the passage in front of a lens of one frame 102. This makes it possible to achieve much higher composing speeds.

Accurate positioning of the CRT beam can be achieved by the means shown in FIGURES 13 and 14. The CRT associated with the matrix 100 is shown at 220 in FIGURE 13. This CRT is "slaved" to the beam positioning CRT 219. A plate or grid 221 is located against the face of CRT 219. This plate can be as shown in FIG. 15 or can be coded as shown at 500 in FIG. 15 of copending application Ser. No. 321,827. The beam of monitor CRT 219 is normally located so as to produce a luminous spot on an origin or zero line of plate 221. Following the command to flash a character the beam of CRT is made to sweep the plate in the direction of the arrow of FIG. 15 and pulses are generated by photocells 236 and 237 located at both ends of a light guide 222 as shown in FIGURE 14. After proper amplification in block 239 the pulses are sent to a counter 244 and a comparison circuit 240 which continuously compares the position of counter 244 to the accumulated width value of the character to flash directed by wire 241 from the storage of the machine. When these values agree, a pulse is generated which is transmitted wire 242 to the unblanking circuit of the slaved CRT 200.

The machine can be modified to replace the CRT as illumination means by other means such as a laser associated with light deflecting means sensitive to electrical or magnetic fields as is known in the art.

Figure 16:
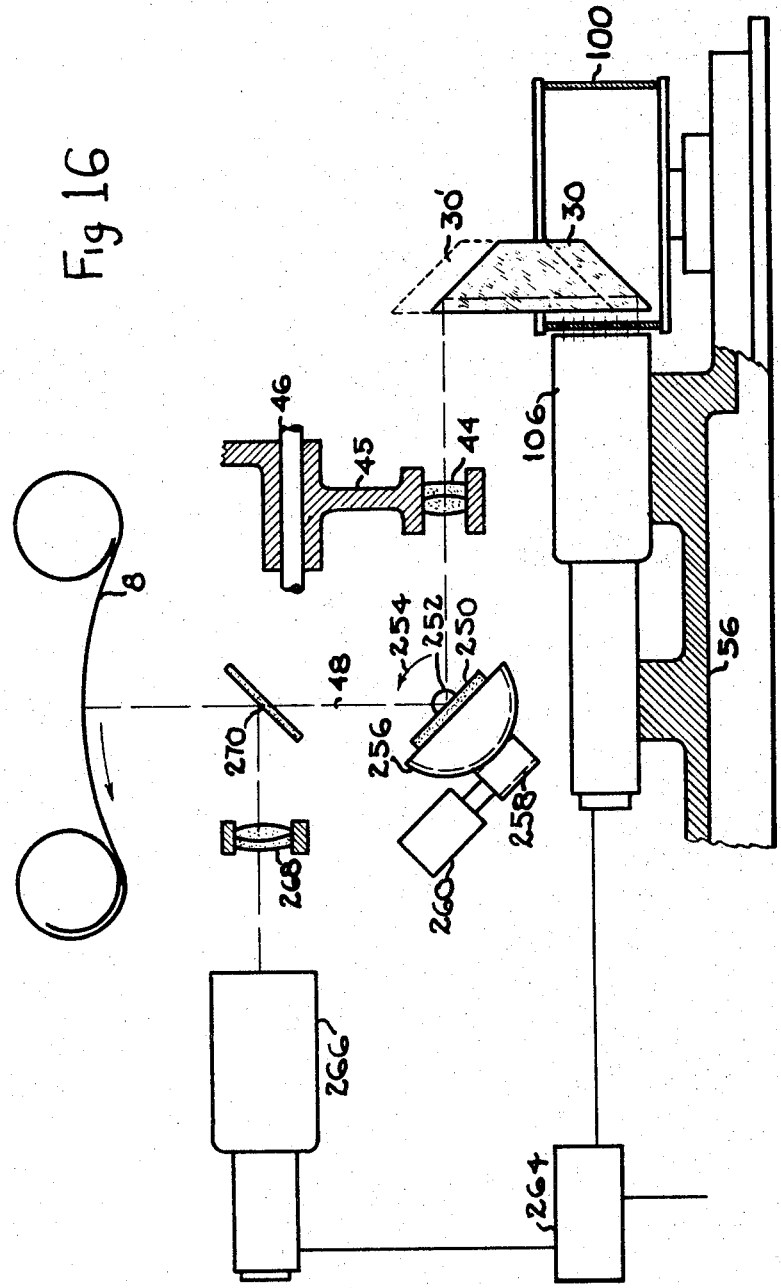
FIG. 16 shows another embodiment of the invention where the optical system incorporates a rapid leading device.

FIGURE 16 shows an alternative embodiment of the present invention which features a means for insertion of graphic or pictorial material on to the film and also features a means for very rapid leading between lines of composition.

The matrix projection section is identical to that shown in FIG. 10. However, after the light has passed through the magnifying lens 44 it strikes mirror 250 and is deflected along a path indicated generally at 48 onto the film 8.

The mirror 250 is pivoted around the shaft 252 in the direction indicated by arrow 254 after each line is projected. This movement is accomplished by the half-circle gear sector 256 upon which the mirror is mounted. Meshing with gear sector 256 is pinion 258 which is driven by stepping motor 260. After the projection of each line, the stepping motor is actuated to move the mirror a sufficient number of steps so that the next line will be projected spaced from the previous line by a chosen amount of leading. With this arrangement the film 8 is supported in a curved configuration such that the length of the optical path remains unchanged as the lines are projected from the top to the bottom of the page. When all the lines have been projected onto the film for one page the film is advanced so that a new unexposed page area is in position.

When it is desired to insert graphic or pictorial material into the composition gate 264 feeds signals to CRT 266 instead of CRT 106. These signals cause the pictorial material to be displayed on the face of CRT 266. The image on the face of the tube is projected through lens 268 and deflected by half-silvered beam splitter 270 onto the film 8.

I claim:

1. In photographic type composing apparatus the combination of a continuously moving matrix upon which are carried master characters, a fixed optical system effective to project images of the master characters onto a film plane, a cathode ray tube positioned in close proximity to the continuously moving matrix, means for forming on the face of the cathode ray tube a patch of light positioned to illuminate a selected character at the precise moment when it will be projected onto the film plane in an exactly predetermined position, said position corresponding to the total accumulated widths of all the characters and spaces previously composed on a line, timing slits carried on the continuously moving matrix band, the said timing slits spaced an integral number of character width units apart, means to detect the passage of these timing slits past a fixed station and effective to generate an electrical pulse at each passage, means to count such pulses and constantly compare the total of such timing pulses to the displacement value of the character to be projected, means to unblank the beam of the cathode ray tube at the time where equality is achieved, and a film holder for holding a sensitized sheet in the film plane.

2. In photographic type composing apparatus, the comination of a matrix of master characters carried on a continuously moving matrix band, said characters arranged on the matrix band in a plurality of rows, a fixed optical system effective to project the characters located in a projection area of the matrix band onto a film plane and effective to merge every row on a common base line in the film plane, a character illuminating means comprising a cathode ray tube effective to form on its face in a precisely controlled area a patch of light for a very short period of time, means to deflect the beam of the cathode ray tube so that the patch of light may be formed on its face with sufficient deflection from the horizontal axis so that a character in any one of the plurality of rows may be illuminated, said patch being positioned to illuminate the selected character on the matrix band when it is in the precise position to be projected onto the film plane in the desired position in a line of composition.

3. In photographic type composing apparatus the combination of a continuously moving matrix upon which are carried master characters, a fixed optical system effective to project images of the master characters onto a film plane, said optical system comprising two lenses (216) and (217) each respectively associated with two different projection areas of the continuously moving matrix said lenses effective to merge images of the two separate projection areas into one image area at the film plane, a cathode ray tube positioned in close proximity to the continuously moving matrix, means for forming on the face of the cathode ray tube a patch of light positioned to illuminate a selected character at the precise moment when it will be projected onto the film plane in an exactly predetermined position, said position corresponding to the total accumulated widths of all the characters and spaces previously composed on a line, and a film holder for holding a sensitized sheet in the film plane.

References Cited

UNITED STATES PATENTS

| | | | |
|---|---|---|---|
| 3,134,090 | 5/1964 | Blakely | 95—4.5 X |
| 3,299,418 | 1/1967 | Treseder | 340—324 |

JOHN M. HORAN, *Primary Examiner*.